US012476427B2

(12) United States Patent
Liu et al.

(10) Patent No.: US 12,476,427 B2
(45) Date of Patent: Nov. 18, 2025

(54) COAXIAL CONNECTOR WITH AN IMPROVED LOCKING STRUCTURE

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventors: Hong-Bing Liu, Kunshan (CN); De-Jin Chen, Kunshan (CN)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 378 days.

(21) Appl. No.: 18/152,760

(22) Filed: Jan. 11, 2023

(65) Prior Publication Data

US 2023/0238752 A1 Jul. 27, 2023

(30) Foreign Application Priority Data

Jan. 22, 2022 (CN) ......................... 202220172090.2

(51) Int. Cl.

| | |
|---|---|
| ***H01R 24/40*** | (2011.01) |
| ***H01R 13/516*** | (2006.01) |
| ***H01R 13/629*** | (2006.01) |
| ***H01R 13/639*** | (2006.01) |
| ***H01R 103/00*** | (2006.01) |

(52) U.S. Cl.

CPC ........... *H01R 24/40* (2013.01); *H01R 13/516* (2013.01); *H01R 13/629* (2013.01); *H01R 13/639* (2013.01); *H01R 2103/00* (2013.01)

(58) Field of Classification Search

CPC ...... H01R 24/50; H01R 24/40; H01R 13/516; H01R 13/629; H01R 13/639; H01R 2103/00

USPC ........................................... 439/63, 581, 578

See application file for complete search history.

(56) References Cited

U.S. PATENT DOCUMENTS

| | | | | |
|---|---|---|---|---|
| 2008/0254676 A1* | 10/2008 | Chien | H01R 24/50 | 439/581 |
| 2009/0117779 A1* | 5/2009 | Zhang | H01R 24/50 | 439/581 |
| 2013/0084739 A1* | 4/2013 | Lin | H01R 24/50 | 439/578 |
| 2015/0104974 A1* | 4/2015 | Hirakawa | H01R 9/0512 | 439/578 |
| 2018/0301834 A1* | 10/2018 | Dandl | H01R 13/20 | |
| 2019/0190169 A1* | 6/2019 | Nishiyama | H01R 24/40 | |

FOREIGN PATENT DOCUMENTS

CN 211456038 U 9/2020

* cited by examiner

*Primary Examiner* — Gary F Paumen
(74) *Attorney, Agent, or Firm* — Ming Chieh Chang

(57) ABSTRACT

An coaxial connector includes: an insulating housing defining an upper face and a lower face; a first conductor retained in the housing; and a second conductor having a tubular portion surrounding the first conductor, wherein the tubular portion defines a circumferential locking groove at an inner face thereof.

8 Claims, 6 Drawing Sheets

COAXIAL CONNECTOR WITH AN IMPROVED LOCKING STRUCTURE

BACKGROUND OF THE INVENTION

Field of the Invention

The present invention relates to a coaxial connector, and particularly to a coaxial connector with an improved locking structure.

Description of Related Arts

Coaxial connectors are often used in applications for transmitting high frequency signals, such as radio frequency (RF) and microwave signals within the circuitry of a system. When the coaxial connectors are used in moving environments, such as vehicles and drones, more stable connections of two coaxial connectors are needed.

Therefore, an improved coaxial connector is desired.

SUMMARY OF THE INVENTION

A coaxial connector comprises: an insulating housing defining an upper face and a lower face; a first conductor retained in the insulating housing and vertically and upwards extending from the upper face; and a second conductor having a tubular portion surrounding the first conductor, wherein the tubular portion defines a circumferential locking groove at an inner face thereof.

Other advantages and novel features of the invention will become more apparent from the following detailed description of the present embodiment when taken in conjunction with the accompanying drawings.

DETAILED DESCRIPTION OF THE DRAWINGS

Figure 4:
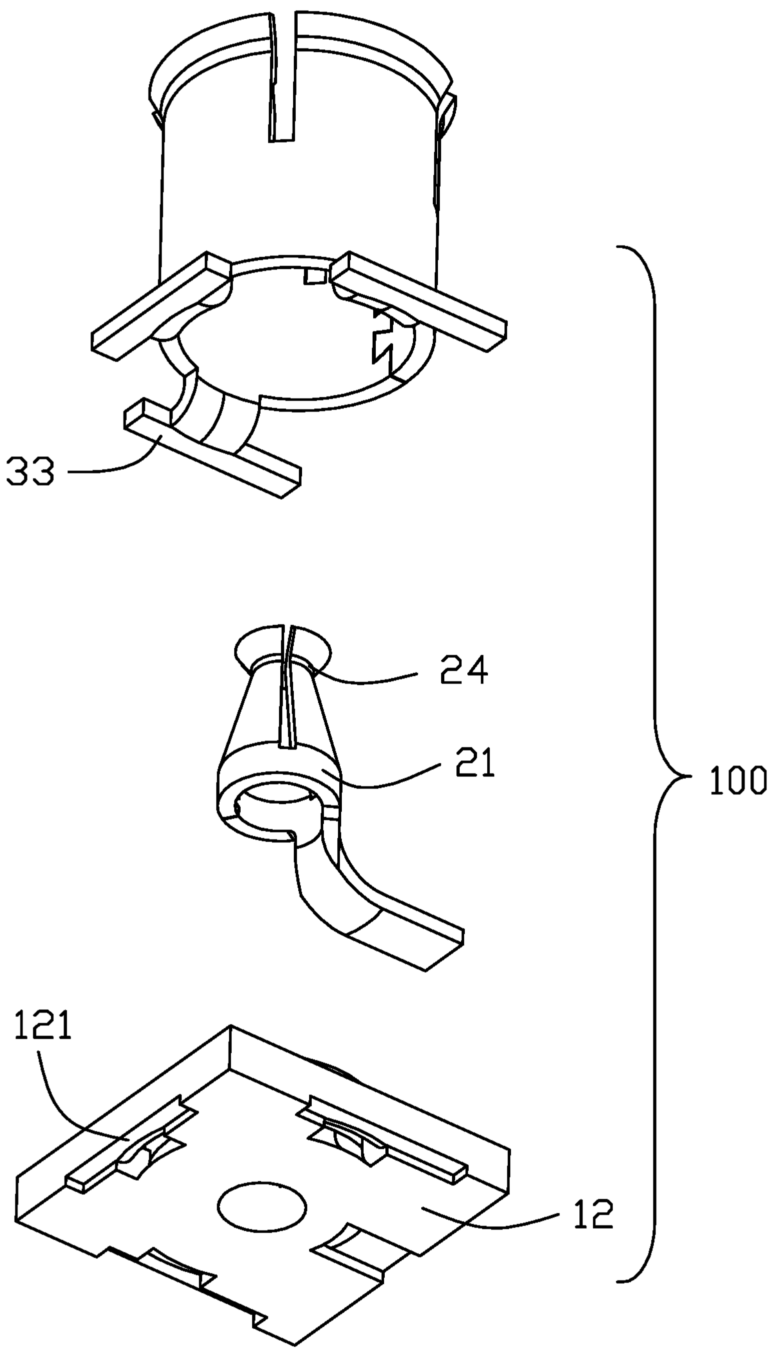
FIG. 4 is an exploded perspective view of the coaxial receptacle connector of FIG. 2.
Figure 5:
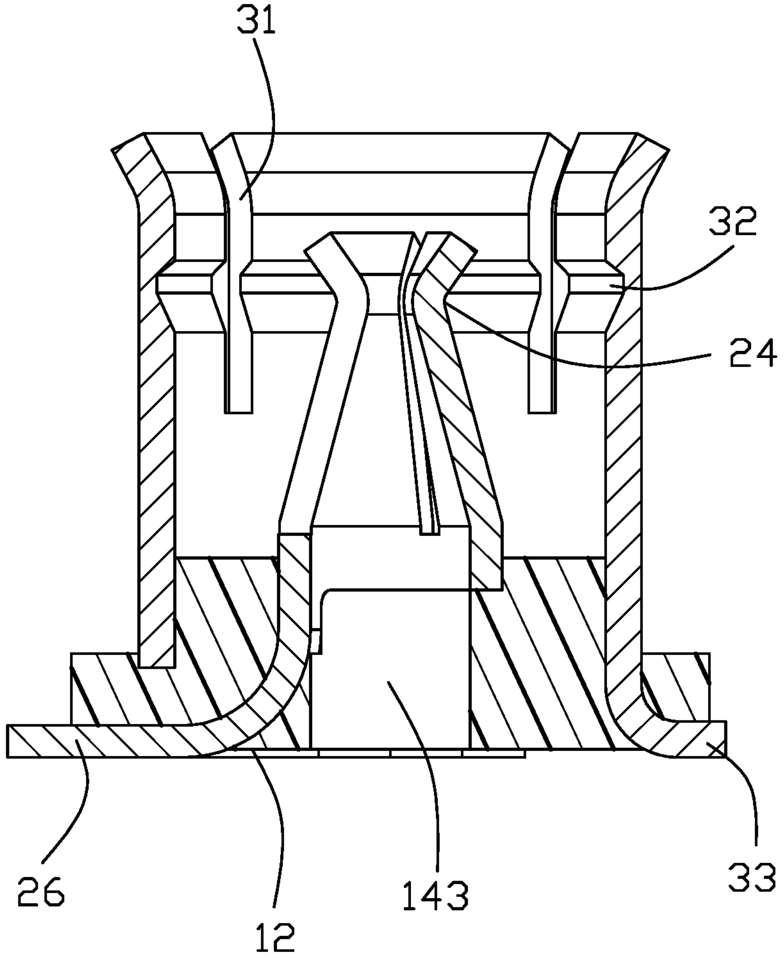
FIG. 5 is a cross-sectional view of the coaxial receptacle connector of FIG. 1 along line 5-5.
Figure 6:
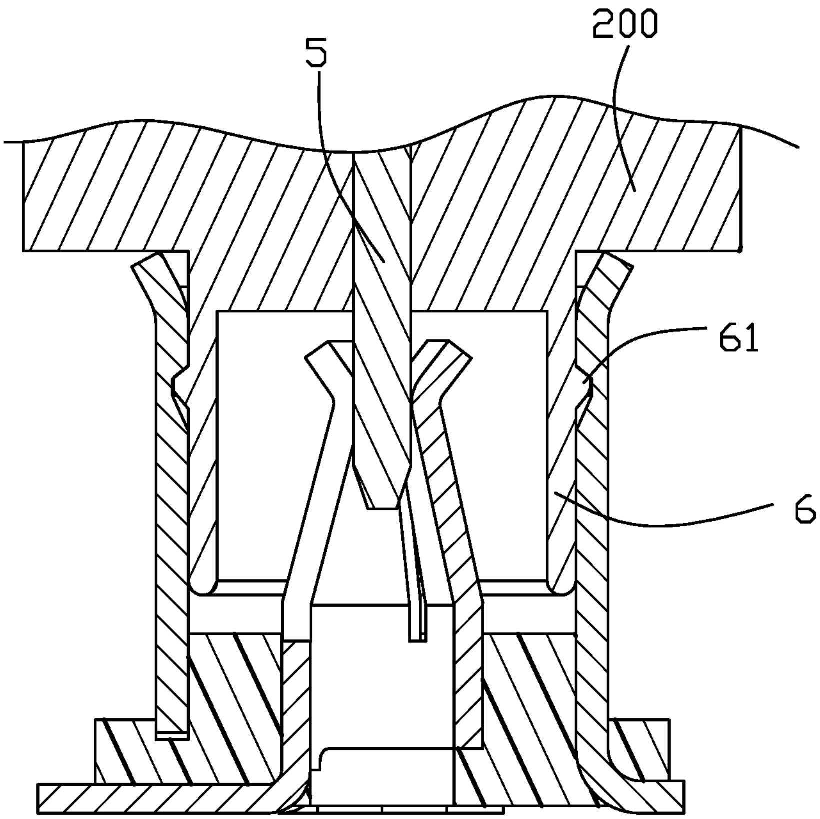
FIG. 6 is a cross-sectional view of the coaxial receptacle connector mated with a coaxial plug connector.

Referring to FIGS. 1 to 6 illustrating an embodiment of this present invention, a coaxial receptacle connector 100 is adapted for being mounted on a printed circuit board and engaged with a coaxial plug connector 200 as shown in FIG. 6, which includes an insulating housing 1, a first conductor 2 and a second conductor 3 retained on the insulating housing 1. The first conductor 2 vertically extends upwards from the housing 1 and the second conductor 3 is of a tubular shape and surrounds the first conductor 2. That is, the first conductor 2 is a type of an inner conductor while the second conductor 3 is a type of an outer conductor surrounding the inner conductor. The second conductor 3 includes a tubular portion 30 defining a ring locking groove 32 at an inner face of the tubular portion 30. The ring locking groove 32 recesses outwardly from the inner face of the tubular portion 30 and extends circumferentially around the tubular portion 30. During an engagement of the receptacle connector 100 and the plug connector 200 as shown in FIG. 6, a ring lump portion 61 of the plug connector 200 protrudes into the ring locking groove 32, so as to enhance a connection stability between the receptacle connector 100 and the plug connector 200 introduced hereinafter. The tubular portion 30 defines three slots 31 which open upwards and through both the inner and outer faces of the tubular portion 30 and extend across the ring locking groove 32. Therefore, a deformation force of the tubular portion 30 is increasing and the tubular portion 30 provides with a better clamping effect. Three leg portions 33 bend outwards and horizontally from a lower edge of the tubular portion 30.

Figure 1:
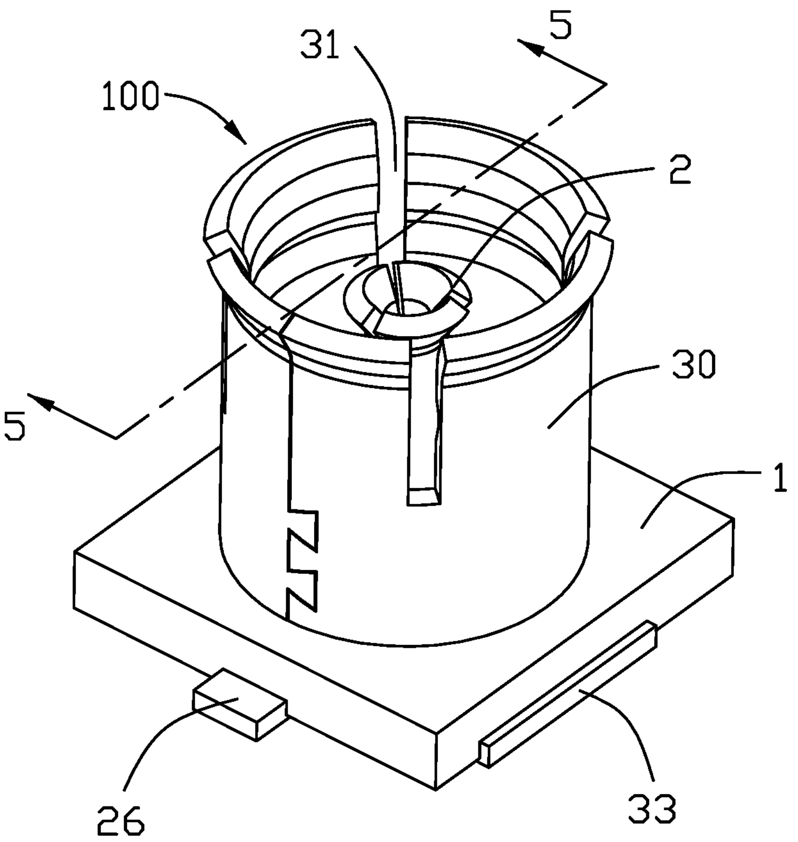
FIG. 1 is a top perspective view of a coaxial receptacle connector.
Figure 2:
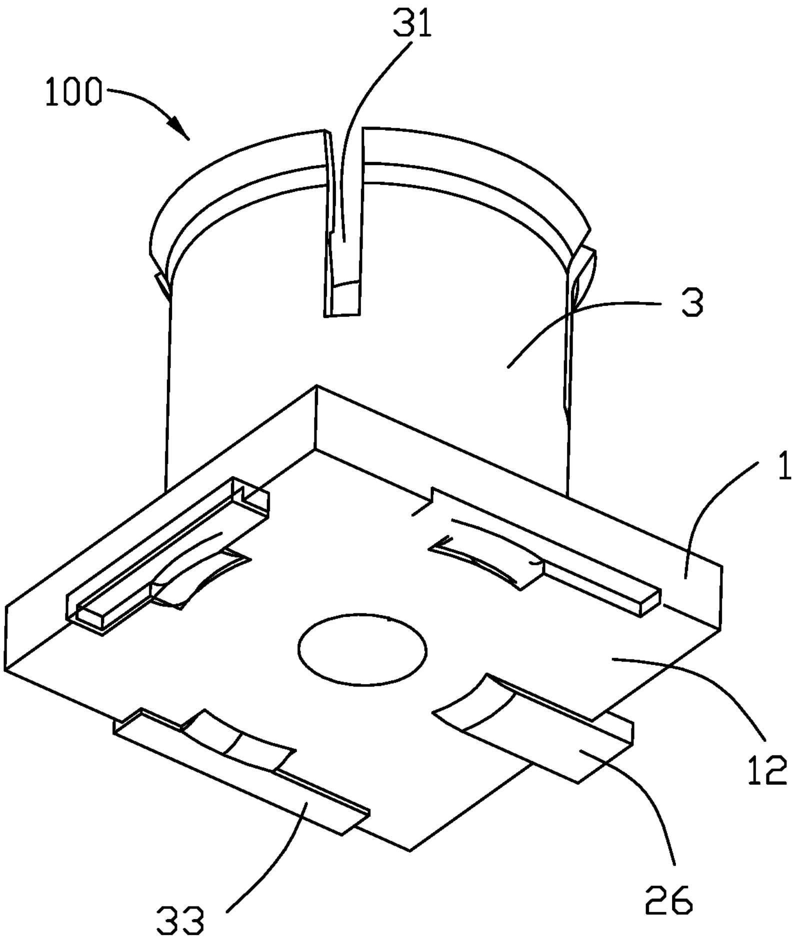
FIG. 2 is a bottom perspective view of the coaxial receptacle connector of FIG. 1.
Figure 3:
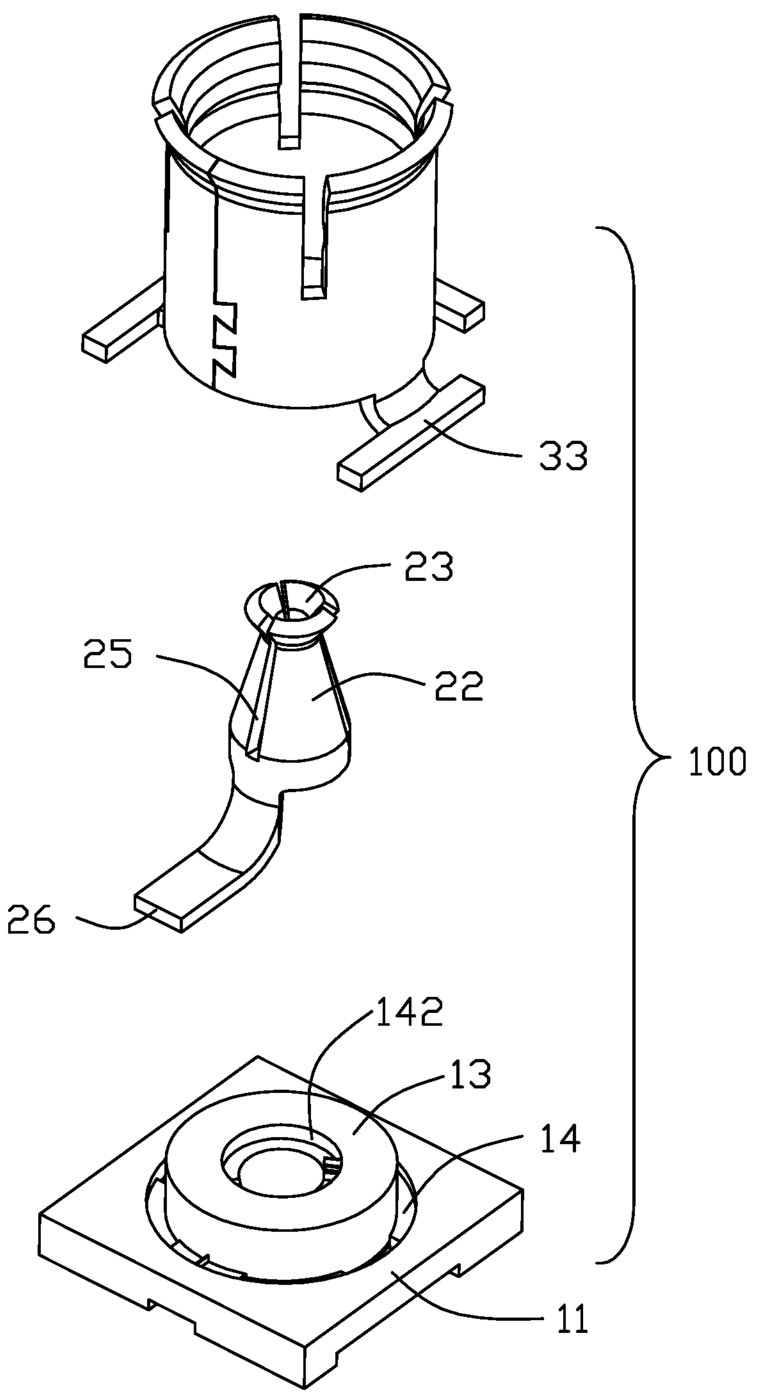
FIG. 3 is an exploded perspective view of the coaxial receptacle connector of FIG. 1.

Referring to FIGS. 3-5, the first conductor 2 is tubular and comprises a ring holding portion 21 fixed in the housing 1, a contacting portion 22 extending upwards and gradually shrinking along a radial direction from the holding portion 21, a guide portion 23 above the contacting portion 22, and a neck portion 24 jointing the contacting portion 22 and the guide portion 23. A leg portion 26 bends outwards from a bottom of the holding portion 21. As shown in FIG. 5, the locking groove 32 and the neck portion 24 are located on a same horizontal plane, to strengthen a clamping force between the receptacle connector 100 and the plug connector 200. In this embodiment, the guide portion 23 is of a trumpet shape with an upward opening, the first conductor 2 defines three slots 25, the slots 25 open upward which extend from a top of the guide portion 23 to the contacting portion 22 thereof. Therefore, the slots 25 cut the guide portion 23 and the contacting portion 22 into three-elastic arm structure. The slots 31, 25 reduce interference force between the two connectors.

The insulating housing 1 defines an upper face 11 and a lower face 12, a lug portion 13 protruding upwards from the upper face 11, and a first retaining groove 14 at a bottom of the lug portion 13. The first conductor 2 is retained in a middle portion of the lug portion 13 and protrudes upwards. The second conductor 3 is retained in the insulating housing 1 and surrounds the lug portion 13. The leg portions 26, 33 of the first and the second conductors 2, 3 extend from a bottom face of housing 1. In this embodiment, a lower end of the tubular portion 30 are received in first retaining groove 14 and the leg portions 33 are located in receiving grooves 121 defined on the lower face of the housing. Preferably, in an upper and lower direction, a thickness of the leg portions 33 is slightly greater than a depth of the receiving grooves 121, so that the leg portions 33 protrude downwards beyond the lower face 12 of the housing 1 for a better electrically connection with the printed circuit board. The holding portion 21 is received in a second retaining groove 142 defined in a middle portion of the lug portion 13. In this embodiment, the housing 1 defines a through hole 143 beneath the second retaining groove 142 and passes through the lower face 12 thereof. The inner face of the through hole 143 is flush with the holding portion 21, i.e., the inner face of the through hole 143 and the holding portion 21 are in a smooth transition. In this embodiment, the housing 1, the first conductor 2 and the second conductor 3 are united by injection molding process, to make the first conductor 2 more reliably held in the housing 1.

Referring to FIG. 6, the plug connector 200 comprises a plug housing, a third conductor 5 and a fourth conductor 6 retained on the plug housing. The fourth conductor 6 is of a tubular shape and surrounds the third conductor 5 of a pin shape. The fourth conductor 6 defines a lump portion 61 matching with the locking groove 32. When the receptacle connector 100 is mated with the plug connector 200, the third conductor 5 is inserted into the first conductor 2 and the fourth conductor 6 is inserted into the second conductor 3 to establish an electric path, and the lump portion 61 snaps into the locking groove 32 for further locking of the two connectors. The receptacle connector 100 is mounted on the printed circuit board, and the plug connector 200 can be a cable connector or a board connector. The engagement of the lump portion 61 and the locking groove 32 can strengthen a stability of the connection between the receptacle connector 100 and the plug connector 200.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. A coaxial connector comprising:

an insulating housing defining an upper face and a lower face;

a first conductor retained in the insulating housing and vertically and upwards extending from the upper face; and a second conductor having a tubular portion surrounding the first conductor;

wherein the tubular portion defines a circumferential locking groove at an inner face thereof; and wherein the insulating housing defines a lug portion protruding upwards, and a lower portion of the second conductor fitly surrounds the lug portion.

2. The coaxial connector as claimed in claim 1, wherein the tubular portion has three slots opening upwards and passing through the inner face and the outer face of the tubular portion.

3. The coaxial connector as claimed in claim 2, wherein the slots extend across the locking groove.

4. The coaxial connector as claimed in claim 1, wherein the first conductor comprises a holding portion fixing in the housing, a contacting portion extending upwards and gradually and radially shrinking, a guide portion above the contacting portion, and a neck portion jointing the contacting portion and the guide portion.

5. The coaxial connector as claimed in claim 4, wherein the guide portion is of a trumpet shape with an upward opening.

6. The coaxial connector as claimed in claim 4, wherein the first conductor defines three slots opening upward and extending downward to the contacting portion, thereby forming an elastic structure.

7. The coaxial connector as claimed in claim 4, wherein the locking groove and the neck portion are substantially located at a same horizontal plane.

8. The coaxial connector as claimed in claim 1, wherein the first conductor and the second conductor and the insulating housing are insert molded together.

* * * * *